E. J. McKINNEY.
MEASURING INSTRUMENT FOR CURVED SURFACES.
APPLICATION FILED JAN. 19, 1916.
1,207,582.
Patented Dec. 5, 1916.
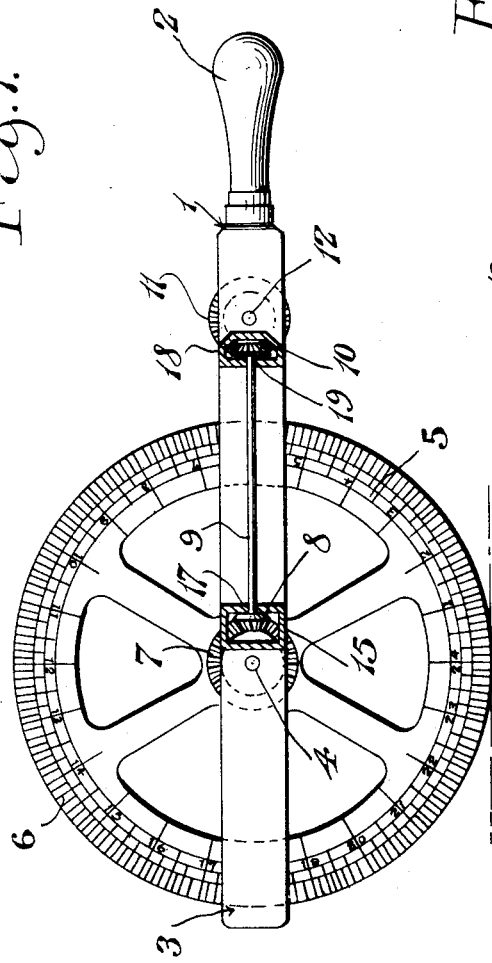
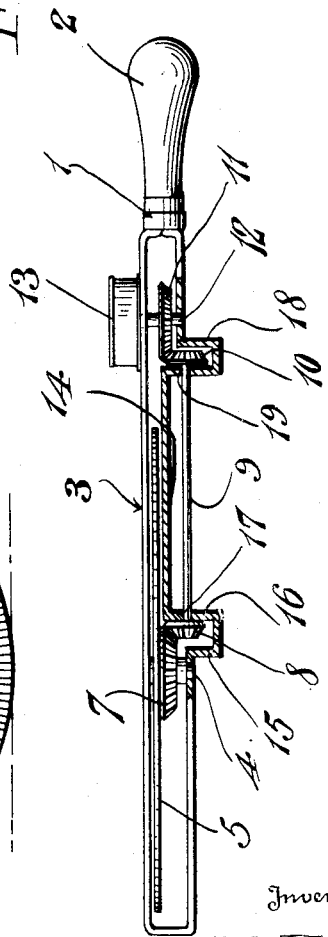
Inventor,
E. J. McKinney.

UNITED STATES PATENT OFFICE.

ELNATHAN J. McKINNEY, OF OZONA, TEXAS.

MEASURING INSTRUMENT FOR CURVED SURFACES.

1,207,582. Specification of Letters Patent. Patented Dec. 5, 1916.

Application filed January 19, 1916. Serial No. 73,019.

*To all whom it may concern:*

Be it known that I, ELNATHAN J. McKIN-NEY, a citizen of the United States, residing at Ozona, in the county of Crockett and State of Texas, have invented certain new and useful Improvements in Measuring Instruments for Curved Surfaces; and I do hereby declare the following to be a full, clear, and exact description of the invention, such as will enable others skilled in the art to which it appertains to make and use the same.

This invention relates to a measuring instrument particularly adapted for measuring curved surfaces, and the primary object of the invention is to provide a measuring instrument of this nature which includes a rotatable disk which is graduated about its circumference in any linear measurements, and to provide a handle for supporting the disk for moving the disk over a curved surface, at which time the disk is rotated for measuring the linear measurements of the curved surface.

A further object of this invention is to provide a measuring instrument as specified which includes a recorder operatively connected to the rotatable measuring disk for recording the distance of travel of the disk.

A still further object of this invention is to provide a novel form of handle structure, which is constructed for forming supports and housings for the shaft and gears used in operatively connecting the recorder to the rotatable measuring disk.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawing, wherein like characters designate like and corresponding parts throughout the several views, and in which:

Figure 1 is a plan view of the improved instrument, showing parts thereof in section, Fig. 2 is side elevation of the improved instrument, showing parts thereof in section.

Referring more particularly to the drawing, 1 designates the handle structure of the measuring instrument, which has a hand grip 2, and an elongated supporting portion 3, which is constructed of any suitable type of sheet metal and is connected to the hand grip 2. A pin 4 is rotatably supported by the supporting structure 3 of the handle 1 and it has a disk 5 mounted thereon. The disk 5 has its surface adjacent its periphery graduated, as is shown at 6, in any desired linear measure, which graduations divide the circumference of the disk. A beveled gear 7 is connected to the central portion of the disk 5 for rotation therewith, and it meshes with a bevel pinion 8, which is fixed upon the shaft 9. The shaft 9 has a second pinion 10 fixed thereon, which meshes with a beveled gear 11. The beveled gear 11 is fixed upon a pin 12, which is operatively connected to a recording mechanism generically indicated at 13.

The recording instrument 13 may be of any ordinary or well known type of recorder which will properly record the distance the disk 5 travels over. The section 14 of the supporting structure 3 of the handle 1 is bent outwardly, as is shown at 15, to form a housing for the beveled pinion 8, and the side 16 of the housing 15 is provided with an opening 17 through which the shaft 9 extends, thereby forming a bearing for the shaft. The guide 14 is also bent outwardly, as is shown at 18, to form a housing for the beveled pinion 10. The guide 19 of the housing 18 forms a bearing for the shaft 9.

When it is desired to measure the circumference of a sphere or a curved surface, the periphery of the disk 5 is placed in engagement with the surface, and the instrument is moved over the surface of the curved surface to be measured which will rotate the disk 5. The distance traveled by the disk 5 is recorded by the recording structure 13, or the scale 6 may be employed for measuring the surface if desired. The gears 7, 8, 10 and 11 are properly proportioned to insure the proper action of the recorder 13 with respect to the rotation of the disk 5.

In reducing the invention to practice certain minor features of construction, combination and arrangement of parts may necessitate alterations to which the patentee is entitled, provided such alterations are comprehended within the scope of what is claimed.

What is claimed is:

1. In a measuring instrument, the combination, of a handle structure including a hand grip and a supporting portion, said supporting portion being formed of sheet metal and having spaced sections, a disk rotatably supported by said supporting portion of said handle, a beveled gear connected to said disk, a recorder carried by said supporting portion, a beveled gear operatively connected to said recorder, a shaft and beveled pinions mounted upon said shaft and operatively connected to said beveled gears for operatively connecting the recorder and said disk, said disk having graduations formed thereupon about its periphery.

2. In a measuring instrument, the combination, of a handle structure including a hand grip and a supporting portion, said supporting portion being formed of sheet metal and having spaced sections, a disk rotatably supported by said supporting portion of said handle, a beveled gear connected to said disk, a recorder carried by said supporting portion, a beveled gear operatively connected to said recorder, a shaft, beveled pinions mounted upon said shaft and operatively connected to said beveled gears for operatively connecting the recorder and said disk, said disk having graduations formed thereupon about its periphery, portions of said supporting portion of said handle being shaped to form housings for said beveled pinions.

3. In a recording instrument, the combination, of a handle including a hand grip and a supporting portion, said supporting portion being constructed of flat metal and including a pair of spaced sections, a disk rotatably supported by said supporting portion, a beveled gear connected to said disk for rotation therewith, a recorder carried by said handle, a beveled gear operatively connected to said recorder, a shaft, beveled pinions mounted upon the ends of said shaft and meshing with said beveled gears for operatively connecting said disk and said recorder, portions of one section of the supporting portion of said handle being bent outwardly for forming housings for said beveled pinions and bearings for said shaft.

In testimony whereof I affix my signature in presence of two witnesses.

ELNATHAN J. McKINNEY.

Witnesses:
CHAS. E. DAVIDSON,
J. B. SMITH.

Copies of this patent may be obtained for five cents each, by addressing the "Commissioner of Patents, Washington, D. C."